United States Patent Office 2,911,641
Patented Nov. 3, 1959

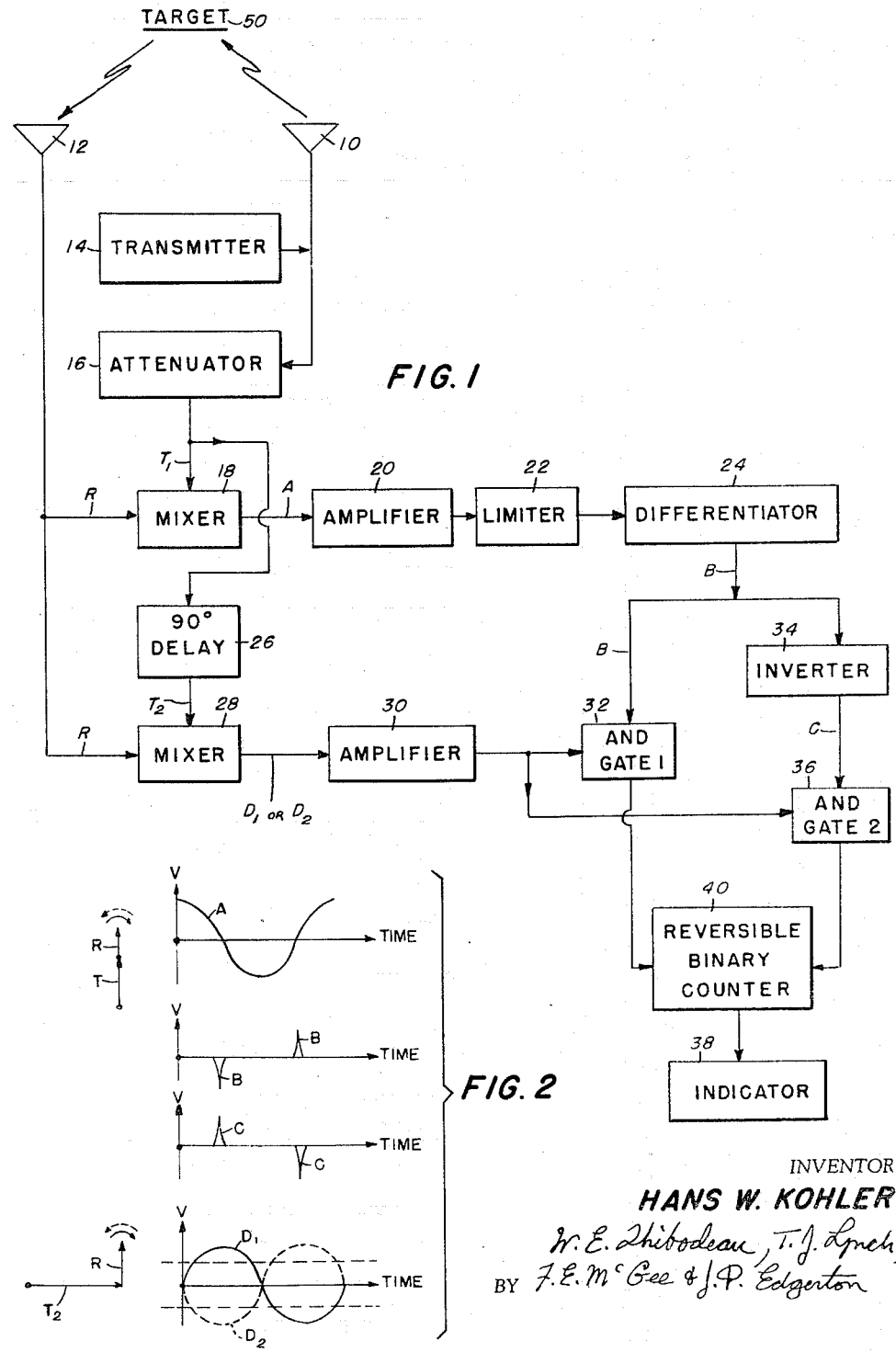

2,911,641

ELECTRONIC DIRECTION SENSITIVE DOPPLER DEVICE

Hans W. Kohler, Washington, D.C., assignor to the United States of America as represented by the Secretary of the Army Application December 13, 1957, Serial No. 702,740

1 Claim. (Cl. 343—12)

(Granted under Title 35, U.S. Code (1952), sec. 266)

The invention described herein may be manufactured and used by or for the Government for governmental purposes without the payment to me of any royalty thereon.

This invention relates to doppler distance responsive devices in general, and more particularly to an electronic direction sensitive doppler device.

It was shown in an article in Proc. of the I.R.E., vol. 43, No. 6, June 1955, pp. 688–700, that there could be constructed a direction sensitive doppler device incorporating a two-phase motor whose armature has an angular velocity proportional to the relative velocity of a target, and a direction of rotation dependent upon whether the distance to the target is increasing or decreasing. The difficulty with this device is that the motor is limited as to frequency response, and cannot be used to measure high frequency doppler or rapid changes in doppler. Further disadvantages of the motor are that moving parts are involved and it is relatively large in size. Although the aforementioned article indicates that electronic phase comparison and counting devices can be substituted for the motor, there is no teaching as to how such electronic devices could be practically applied to a direction sensitive doppler system. Because of the considerably greater versatility, reliability and accuracy which is possible with a completely electronic system, there is a significantly greater need for the electronic system as compared to the motor system. This is especially true where the direction sensitive doppler system is to be used in conjunction with a guided missile where a high frequency response is a practical necessity.

It is the chief object of this invention, therefore, to provide a simple entirely electronic, direction sensitive doppler device having a high accuracy, and a very high frequency response.

The specific nature of the invention, as well as other objects, uses, and advantages thereof, will clearly appear from the following description and from the accompanying drawing, in which:

Figure 1 is a block diagram of an electronic direction sensitive doppler device in accordance with the invention.

Figure 2 is a graph showing the waveforms and vector relationships at various points in the diagram of Figure 1.

In Figure 1, a transmitter 14 feeds a transmitting antenna 10 radiating electromagnetic energy towards a target 50. The reflected energy is received by a receiving antenna 12 and fed to one input of each of the mixers 18 and 28. A portion of the transmitted energy, obtained from the output of an attenuator 16 connected to the transmitter 14, is fed to the other inputs of the mixers 18 and 28, with a 90° phase delay 26 inserted in the connection to mixer 28.

The output of mixer 18 is the conventional doppler signal shown by A in Figure 2. The diagram to the left of A illustrates, for mixer 18, the vector relationship between the transmitted signal $T_1$ and the received signal R at the instant when vectors $T_1$ and R are in a straight line. The solid arrow in Figure 2 is for decreasing target distance, and the dotted arrow is for increasing target distance. As shown, the doppler signal A from mixer 18 will be the same for both increasing and decreasing target distance.

The output of mixer 28, on the other hand, to which is fed $T_2$ ($T_1$ delayed by 90°), has a doppler signal $D_1$ for increasing target distance, and a doppler signal $D_2$ 180° out of phase with $D_1$ for decreasing target distance. The diagram to the left of $D_1$ and $D_2$ in Figure 2 illustrates the vector relationship between $T_2$ and R for mixer 2. It can be seen that the doppler signal A from mixer 18 will lead the doppler signal $D_1$ from mixer 28 by 90° and lag doppler signal $D_2$ from mixer 28 by 90°.

The above description so far is quite similar to that of the device described in the aforementional I.R.E. publication. However, instead of feeding the amplified outputs of mixers 18 and 28 to the windings of a two-phase motor as taught by that publication, the following novel electronic circuitry is employed in combination with the previously described circuitry.

The amplified conventional doppler signal A is fed to a limiter 22 and a differentiator 24 resulting in the pulses B shown in Figure 2. Where very low doppler frequencies are to be considered, it may be difficult to obtain pulses B of sufficient amplitude from the differentiator 24. This difficulty can be overcome by using a form of the well known Schmitt trigger circuit in place of the limiter 22. The Schmitt circuit will flip over at a given input level no matter how slowly that level is approached.

The output pulses B from the differentiator 24 are fed to one input of a first And gate 32; and also after inversion of the pulses B by an inverter 34, are fed to one input of a second And gate 36. The amplified doppler signal (either $D_1$ or $D_2$ depending upon whether the target distance is increasing or decreasing) is fed to the other inputs of And gates 32 and 36. These And gates 32 and 36 are adapted to produce output pulses only when their inputs are both positive or both negative and also are greater than some minimum amplitudes. One example of such an And gate is the conventional dual grid coincidence tube circuit. In a preferred form, the pulses B and C from the differentiator 24 and inverter 34, respectively, and the amplified doppler signal ($D_1$ or $D_2$) from the mixer 2, are adjusted so that they are of sufficient amplitude to trigger the And gates 32 and 36 as long as the received signal R is above some minimum value. The horizontal dashed lines running through $D_1$ and $D_2$ in Fig. 2 illustrate minimum amplitudes which might be set.

As can be seen from Figure 2, And gate 32 will pulse for each doppler half cycle when the target distance is decreasing, and And gate 36 will pulse for each doppler half cycle when the target distance is increasing. The outputs from the And gates 32 and 36 are fed to opposite inputs of an electronic reversible binary counter 40. A reversible binary counter is well known in the art as a two-input counter which counts "up" in response to pulses applied to one input, counts "down" in response to pulses applied to the other input, and maintains an instantaneous running total of the resultant count of all pulses received in any given period. Since every doppler half cycle is counted, a high order of accuracy can be obtained. From the foregoing description, it will be understood that the instantaneous count of the reversible binary counter 40 is proportional to the target distance at any instant wtih an accuracy equivalent to plus or minus one wavelength of the transmitter frequency. For an X-band transmitter, this accuracy is of the order of plus or minus 1.5 centimeters. The output of the reversible binary counter may be fed to an indicator 38 which shows a visual indication of the instantaneous count.

Such an indicator could be a meter calibrated in feet so as to indicate distance, or change in distance, from an initial position. Or, the indicator 38 could be a computer which feeds information to a main computing system in order to properly direct defending missiles.

It will be apparent that the embodiments shown are only exemplary and that various modifications can be made in construction and arrangement within the scope of the invention as defined in the appended claim.

I claim as my invention:

An electronic direction sensitive doppler device comprising in combinaton: a transmitting antenna for radiating electromagnetic energy towards a target; a transmitter feeding said antenna; a receiving antenna for receiving energy reflected from the target; an attenuator connected to said transmitter and providing at its output a relatively small portion of the transmitted energy; a first mixer having one input connected to the output of said attenuator, and the other input connected to the output of said antenna; a 90° delay network having one end connected to the output of said attenuator; a second mixer having one input connected to the other end of said 90° delay network, and the other input connected to the output of said antenna; a first amplifier connected to the output of said first mixer; a second amplifier connected to the output of said second mixer; a Schmitt trigger circuit connected to the output of said first amplifier; a differentiator circuit connected to the output of said trigger circuit; an inverter circuit connected to the output of said differentiator circuit; first and second And gates, each having first and second inputs, and each being adapted to produce output pulses only when both first and second inputs have the same polarity and also are greater than some predetermined values, the outputs from said inverter and differentiator circuits being connected to the first inputs of said first and second And gates respectively, and the output from said second amplifier being connected to the second outputs of said And gates, the outputs from said differentiator and inverter circuits, and the output from said second amplifier being adjusted to have sufficient values to produce output pulses from said And gates as long as the signal received from said antenna is above a predetermined minimum value; and a reversible binary counter, the outputs of said And gates being connected to opposite inputs of said counter, whereby the instantaneous count of said counter is proportional to the target distance at any instant with an accuracy of plus or minus one wavelength of the transmitter frequency.

References Cited in the file of this patent

UNITED STATES PATENTS

| | | |
|---|---|---|
| 2,525,089 | Blumlein | Oct. 10, 1950 |
| 2,837,736 | Golay | June 3, 1958 |